(12) United States Patent
Okumura (10) Patent No.: US 7,106,405 B2
(45) Date of Patent: Sep. 12, 2006

(54) LIQUID CRYSTAL DISPLAY DEVICE HAVING PARTICULAR ALIGNMENT CONTROLLING ELEMENTS IN TRANSMISSIVE AND REFLECTIVE PIXEL REGIONS

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 10/724,262

(22) Filed: Dec. 1, 2003

(65) Prior Publication Data
US 2004/0165129 A1 Aug. 26, 2004

(30) Foreign Application Priority Data
Dec. 20, 2002 (JP) ............... 2002-369954

(51) Int. Cl.
*G02F 1/1337* (2006.01)
*G02F 1/1335* (2006.01)
(52) U.S. Cl. .............. 349/129; 349/113; 349/114
(58) Field of Classification Search ........ 349/113, 349/114, 129, 130, 141
See application file for complete search history.

(56) References Cited

U.S. PATENT DOCUMENTS

| | | | |
|---|---|---|---|
| 6,195,140 B1 * | 2/2001 | Kubo et al. | 349/44 |
| 6,476,889 B1 | 11/2002 | Urabe et al. | |
| 6,753,939 B1 * | 6/2004 | Jisaki et al. | 349/114 |
| 6,806,929 B1 * | 10/2004 | Chen et al. | 349/114 |
| 2002/0149728 A1 * | 10/2002 | Ogishima et al. | 349/129 |

FOREIGN PATENT DOCUMENTS

| | | |
|---|---|---|
| JP | A 11-242225 | 9/1999 |
| JP | A 11-242226 | 9/1999 |
| JP | A 2000-29030 | 1/2000 |
| JP | 2000-267079 | 9/2000 |
| JP | 2002-174816 | 6/2002 |
| JP | 2002-350853 | 12/2002 |
| KR | 2001-0062353 | 7/2001 |

OTHER PUBLICATIONS

Jisaki et al., "Development of transflective LCD for high contrast and wide viewing angle by using homeotropic alignment," Asia Display, IDW, pp. 133-136, 2001.

* cited by examiner

*Primary Examiner*—Andrew Schechter
*Assistant Examiner*—Michael H. Caley
(74) *Attorney, Agent, or Firm*—Oliff & Berridge, PLC (57) ABSTRACT

To provide a transreflective liquid crystal display device that can produce a bright and high-contrast display with a wide viewing angle. A liquid crystal display device has a liquid crystal layer held between a pair of substrates and has a transmissive display region and a reflective display region in one dot region. The liquid crystal layer includes a liquid crystal being initially vertically aligned and having negative dielectric anisotropy. The pair of substrates have electrodes to drive the liquid crystal on sides facing the liquid crystal layer. The electrodes have openings and protrusions in the transmissive display region and the reflective display region, respectively. The opening areas of the openings and the in-plane occupying areas of the protrusions are larger in the reflective display region than in the transmissive display region.

18 Claims, 11 Drawing Sheets

LIQUID CRYSTAL DISPLAY DEVICE HAVING PARTICULAR ALIGNMENT CONTROLLING ELEMENTS IN TRANSMISSIVE AND REFLECTIVE PIXEL REGIONS

BACKGROUND OF THE INVENTION

1. Field of Invention

The present invention relates to a liquid crystal display device and electronic equipment, and specifically, it relates to a technique to produce a display with a high contrast and a wide viewing angle in a transreflective liquid crystal display device that produces displays both in reflective mode and transmissive mode.

2. Description of Related Art

Certain transreflective liquid crystal display devices working both in reflective mode and transmissive mode are known as liquid crystal display devices. Among such related art transreflective liquid crystal display devices, one including an upper substrate, a lower substrate, and a liquid crystal layer held between the upper and lower substrates and having a reflective film on an inner surface of the lower substrate has been proposed. In this device, the reflective film includes a film of metal, such as aluminum, has a window for optical transmission and functions as a transreflective plate. In reflective mode in this device, extraneous light incident from the upper substrate passes through the liquid crystal layer, is reflected by the reflective film on the inner surface of the lower substrate, passes through the liquid crystal layer again, exits from the upper substrate and thereby contributes to display. In contrast, in transmissive mode, light emitted from a backlight and incident from the lower substrate enters from the window of the reflective film, passes through the liquid crystal layer, exits from the upper substrate to the outside and thereby contributes to display. Of regions where the reflective film is arranged, a region of the window constitutes a transmissive display region, and the other region constitutes a reflective display region.

However, related art transreflective liquid crystal display devices have a narrow viewing angle in transmissive display. This is because these devices have the transreflective plate on the inner surface of the liquid crystal cell for avoiding parallax and must thereby produce reflective display by using only one deflection plate arranged on a side facing an observer. Owing to this constraint, they have a small degree of freedom in optical design. To solve this problem, Jisaki et al. propose a liquid crystal display device using a vertically aligned liquid crystal in Development of transreflective LCD for high contrast and wide viewing angle by using homeotropic alignment", M. Jisaki et al., Asia Display/IDW'01, p. 133–136(2001). The device has the following three features.

(1) The device employs "vertical alignment (VA) mode" in which a liquid crystal having negative dielectric anisotropy is aligned vertically to substrates and tilts upon application of a voltage.

(2) It employs a "multi-gap structure" in which a transmissive display region and a reflective display region have different thicknesses in the liquid crystal layer (cell gaps) (see, for example, Japanese Unexamined Patent Application Publication No. H 11-242226).

(3) It employs a "domain division structure" in which the transmissive display region is an equilateral octagonal, and a protrusion is arranged in the center of a transmissive display region on a counter substrate so as to allow the liquid crystal to tilt in eight directions in this region.

However, Jisaki et al. never discloses any configuration to control the tilt direction of the liquid crystal molecules in the reflective display regions, although the tilt direction of the liquid crystal molecules in the transmissive display regions is controlled by the use of protrusions. In the reflective display regions, therefore, the liquid crystal molecules tilt in random directions, which induces discontinuous lines called "disclination" at the interfaces between different regions where liquid crystal molecules have different alignments, thus causing, for example, afterimages. In addition, regions where the liquid crystal molecules have different alignments show different viewing angle characteristics. Thus, rough, spotting uneven display is seen when the liquid crystal display device is viewed from an oblique direction.

Providing such a multi-gap structure in transreflective liquid crystal display devices is very effective to match the electro-optical characteristics (transmittance-voltage characteristics, reflectance-voltage characteristics) between the transmissive display regions and the reflective display regions. This is because the light passes through the liquid crystal layer twice in the reflective display regions, whereas it passes through the liquid crystal layer only once in the transmissive display regions.

Figure 12A:
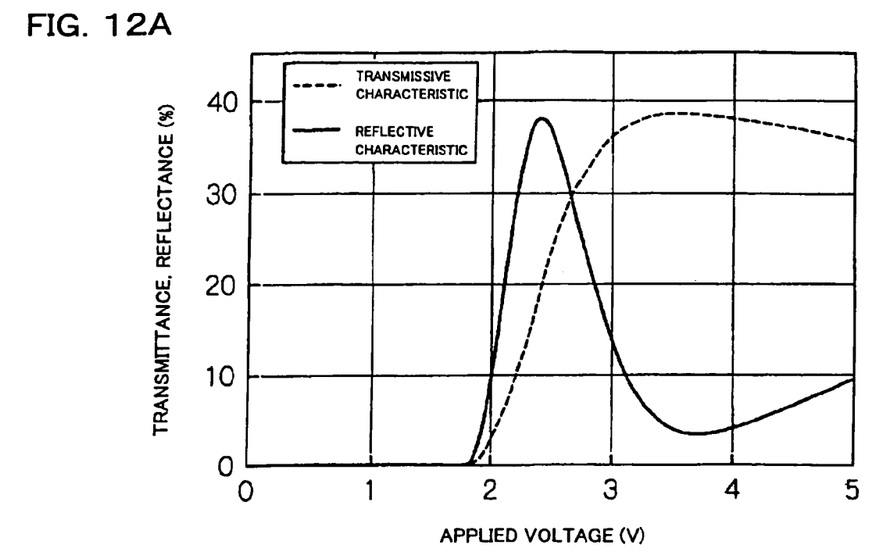
FIGS. 12(A) and 12(B) are a graph showing electro-optical characteristics of a related art liquid crystal display device.
Figure 12B:
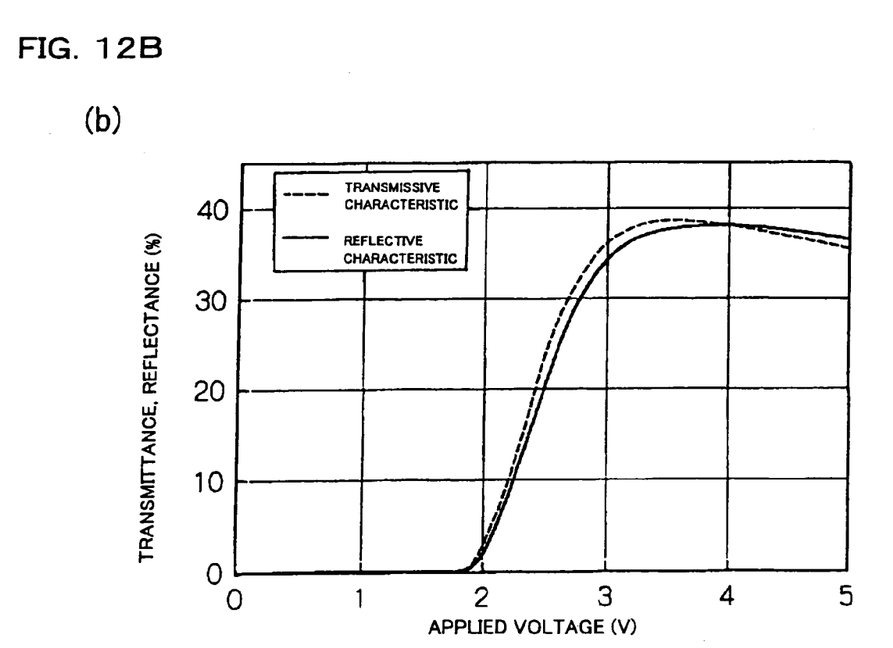

FIGS. 12(A) and 12(B) illustrate effects of the multi-gap structure on the electro-optical characteristics (transmittance-voltage characteristic and reflectance-voltage characteristic). FIG. 12(A) shows the electro-optical characteristics when the transmissive display regions and the reflective display region have the same cell gap. Such a liquid crystal display device having no multi-gap structure has such a reflectance-voltage characteristic that a reflectance excessively sharply drops with an increasing voltage in reflective display and may induce display problems, such as decreased transmittance or the inversion of halftones in reflective display, unless the transmissive display regions and the reflective display regions are driven at different voltages. In contrast, FIG. 12(B) shows the electro-optical characteristics when the transmissive display regions have a cell gap about two times as large as the cell gap of the reflective display regions. By employing such a multi-gap structure the reflectance-voltage characteristics in reflective display substantially match the transmittance-voltage characteristics in transmissive display, and the reflective display regions and the transmissive display regions can be driven at the same voltage.

However, providing the multi-gap structure may induce a decreased substantial aperture, since liquid crystal molecules in step regions are resistant to move. The step regions allow the cell gaps different. In addition, its manufacturing process requires extra photoprocesses for the formation of the multi-gap structure, inviting increased cost.

SUMMARY OF THE INVENTION

The present invention has been accomplished to address the above problems. The present invention provides a transreflective liquid crystal display device that can suppress display failures, such as afterimages and spotting uneven displays, can produce displays with wide viewing angle and can minimize, for example, decreased aperture caused by steps in the case of providing a multi-gap structure. The present invention also provides an easy and suitable technique to control the tilt direction of liquid crystal molecules in reflective display regions and to thereby provide a liquid crystal display device that can produce uniform displays with wide viewing angles both in reflective display and transmissive display.

To achieve the above objects, a liquid crystal display device of an aspect of the present invention includes a pair of substrates and a liquid crystal layer held between the substrates and having a transmissive display region for transmissive display and a reflective display region for reflective display in each dot region. The liquid crystal layer includes a liquid crystal being initially vertically aligned and having negative dielectric anisotropy. The pair of substrates each having an electrode to drive the liquid crystal arranged on a surface facing the liquid crystal layer. The electrode of at least one of the pair of substrates has a slit opening and/or a protrusion as an alignment controlling device to control the alignment of the liquid crystal in each of the transmissive display region and the reflective display region, the slit opening being arranged through a part of the electrode, and the protrusion being arranged on the electrode and including a dielectric, and the opening area of the slit opening and/or the occupying area of the dielectric protrusion in a plane direction of the substrate being set larger in the reflective display region than in the transmissive display region.

The liquid crystal display device of an aspect of the present invention is a transreflective liquid crystal display device in combination with a liquid crystal in vertical alignment mode, which employs a configuration to control the alignment direction upon application of an electric field in the liquid crystal in vertical alignment mode. In the vertical alignment mode, a negative liquid crystal is generally used. Liquid crystal molecules therein are initially vertically aligned to the planes of substrates and are then tilted by the application of electric field. If no device is provided (if pre-tilt is not applied), the tilt direction of the liquid crystal molecules cannot be controlled. Disordered alignment (disclination) occurs to cause display failures, such as optical dropouts and to deteriorate display quality. Controlling the alignment direction of liquid crystal molecules upon application of electric field is an essential key when the vertical alignment mode is employed.

Accordingly, the liquid crystal display device of an aspect of the present invention has, as device to control the alignment of the liquid crystal, slit openings in electrodes and/or protrusions made of a dielectric (e.g., a resin) are formed on the electrodes both in the transmissive display regions and the reflective display regions. The liquid crystal molecules initially show vertical alignment and have pre-tilt corresponding to the shapes of the openings and/or protrusions. The tilt direction of the liquid crystal molecules can thereby be limited or controlled. Thus, the resulting liquid crystal display device can suppress disordered alignment (disclination), can avoid display failures, such as optical dropouts, can suppress display failures, such as afterimages and spotting uneven displays and can have wide viewing angles.

Figure 4:
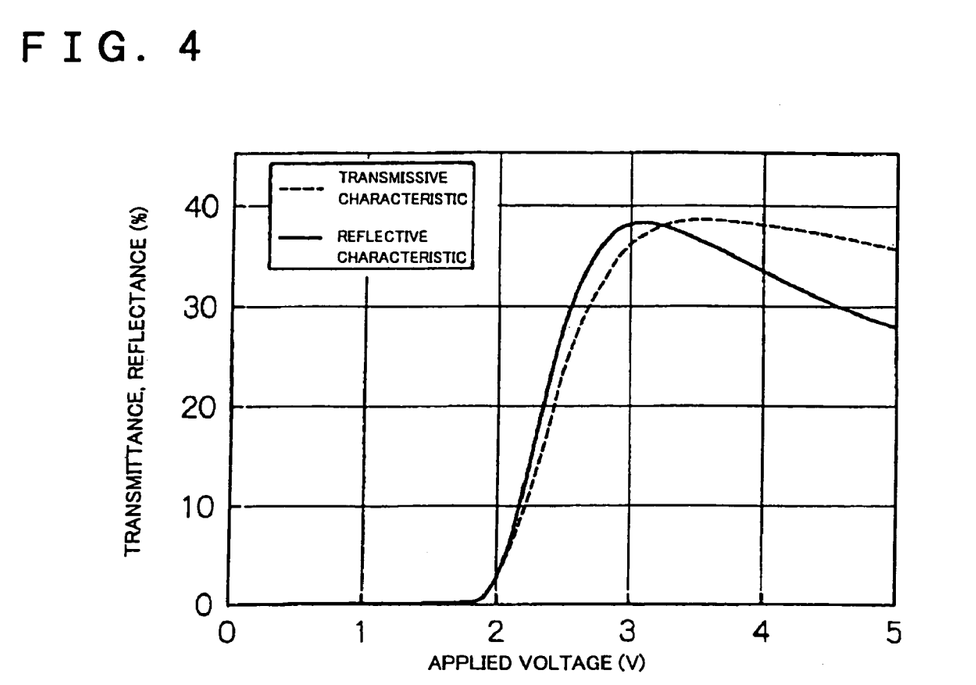
FIG. 4 is a graph showing electro-optical characteristics of the liquid crystal display device.

The opening area of the openings and/or the occupying area of the protrusions in a plane direction of the substrate in the reflective display regions is set larger than the opening area of the openings and/or the occupying area of the protrusions in a plane direction of the substrate in the transmissive display regions. In the reflective display regions, a voltage is less applied to the liquid crystal layer, and the liquid crystal molecules do not tilt in the direction of a voltage unless a high voltage is applied. Accordingly, the electro-optical characteristics in reflective display can match those in transmissive display as shown in FIG. 4, even without employing a multi-gap structure as described in the related art technologies.

Specifically, an aspect of the present invention can produce displays with wide viewing angles based on the aforementioned liquid crystal alignment control effects, can drive liquid crystal molecules in the reflective display regions and the transmissive display regions in the same manner at an equal voltage by a simple configuration and can provide a liquid crystal display device having excellent electro-optical characteristics.

The openings and/or protrusions may have a configuration to control the tilt direction of the vertically aligned liquid crystal molecules. In this case, the vertically aligned liquid crystal molecules can be regularly tilted in a predetermined direction. The resulting liquid crystal display device is resistant to disordered alignment (disclination) of liquid crystal molecules, can avoid display failures, such as optical dropouts and can have excellent display characteristics. The configuration to control the tilt direction of the liquid crystal molecules may be such that the openings and/or protrusions have surfaces inclined at a predetermined angle with respect to the vertical alignment direction of the liquid crystal molecules.

The distances between the individual electrodes arranged on the pair of substrates may be set substantially equal in the transmissive display regions and the reflective display regions.

The term "distance between electrodes" as used herein means a distance between electrodes of the two substrates in regions where the openings and/or protrusions are not arranged. The liquid crystal display device of an aspect of the present invention can have matched electro-optical characteristics in the individual display regions even when the distances between electrodes are substantially equal in the transmissive display regions and the reflective display regions. When one of the substrates has a reflective film to produce reflective displays, the advantages of an aspect of the present invention can be exhibited even when the distances between electrodes are different approximately by the thickness of the reflective film.

The dielectric protrusions may be arranged on the electrodes and may have an inclined surface inclining at a predetermined angle to the electrode surface. By providing the protrusions with an inclined surface, the tilt direction of the liquid crystal molecules can be advantageously controlled in a direction along the inclined surface.

The distance between adjacent two of the openings and/or protrusions arranged in the reflective display regions may be set smaller than the distance between-adjacent two of the openings and/or protrusions arranged in the transmissive display regions. This configuration can suitably increase the areal ratio of the openings and/or protrusions in the reflective display regions than that in the transmissive display regions.

The liquid crystal display device of an aspect of the present invention may include an upper substrate and a lower substrate as the pair of substrates, the lower substrate having a backlight for transmissive display arranged on an opposite side to the liquid crystal layer and having a reflective film on a side facing the liquid crystal layer, the reflective layer being selectively arranged only in the reflective display regions. This configuration can suitably provide a transreflective liquid crystal display device. In addition, by providing a color filter layer on a side of the upper substrate facing the liquid crystal layer or on a side of the reflective film facing the liquid crystal layer, a transreflective liquid crystal display device that can produce color displays can be advantageously provided.

Electronic equipment of an aspect of the present invention includes the aforementioned liquid crystal display device. The resulting electronic equipment can suppress display failures, such as afterimages and spotting uneven displays and can have a display unit with wide viewing angles and excellent display properties.

BRIEF DESCRIPTION OF THE DRAWINGS

FIGS. 3(A and 3(B) are a schematic plan view and a schematic sectional view showing the principle parts of the liquid crystal display device;

DETAILED DESCRIPTION OF PREFERRED EMBODIMENTS

First Exemplary Embodiment

The first exemplary embodiment of the present invention will be illustrated below, with reference to the figures.

A liquid crystal display device according to the present exemplary embodiment is an example of an active-matrix liquid crystal display device using a thin film transistor (hereinafter briefly referred to as TFT) as a switching element.

Figure 1:
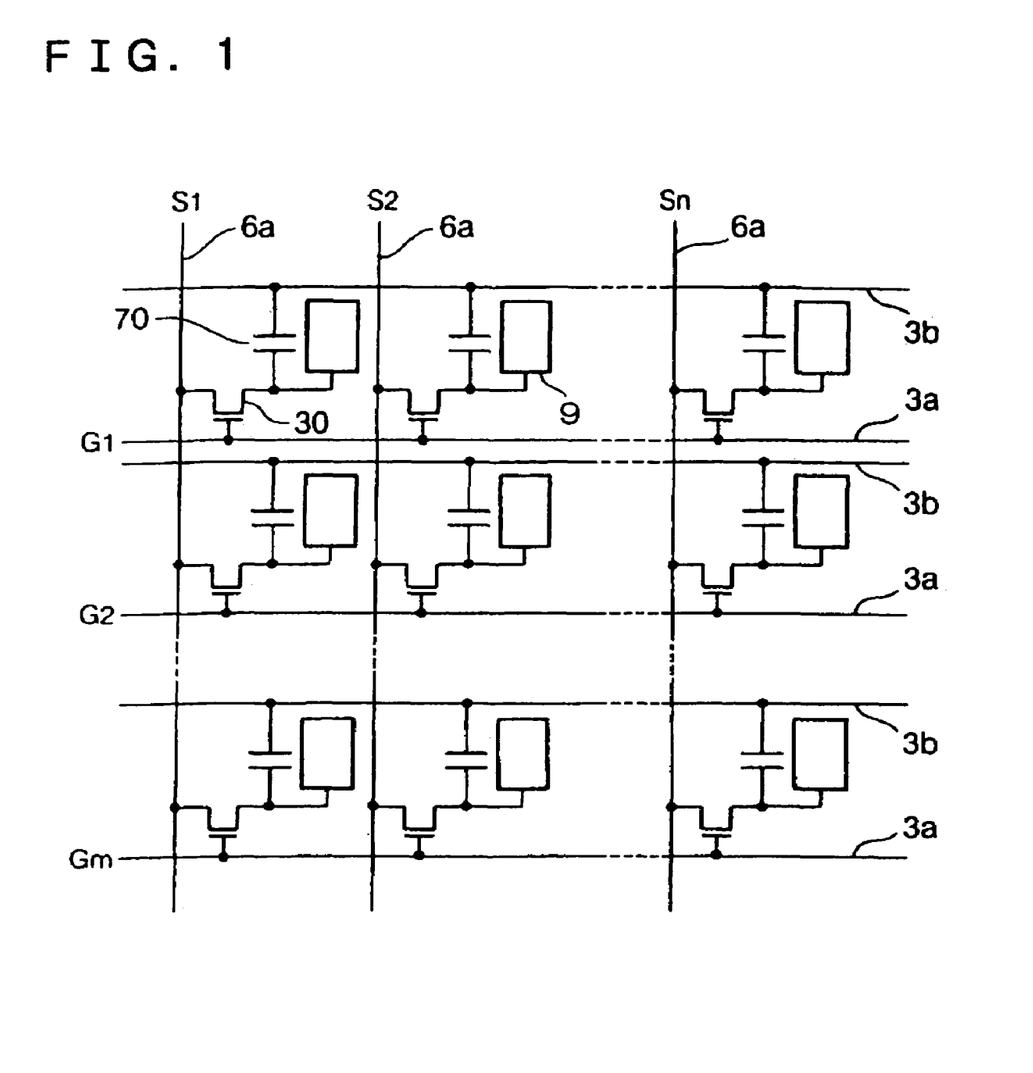
FIG. 1 is an equivalent circuit schematic of a liquid crystal display device according to the first exemplary embodiment of the present invention.
Figure 2:
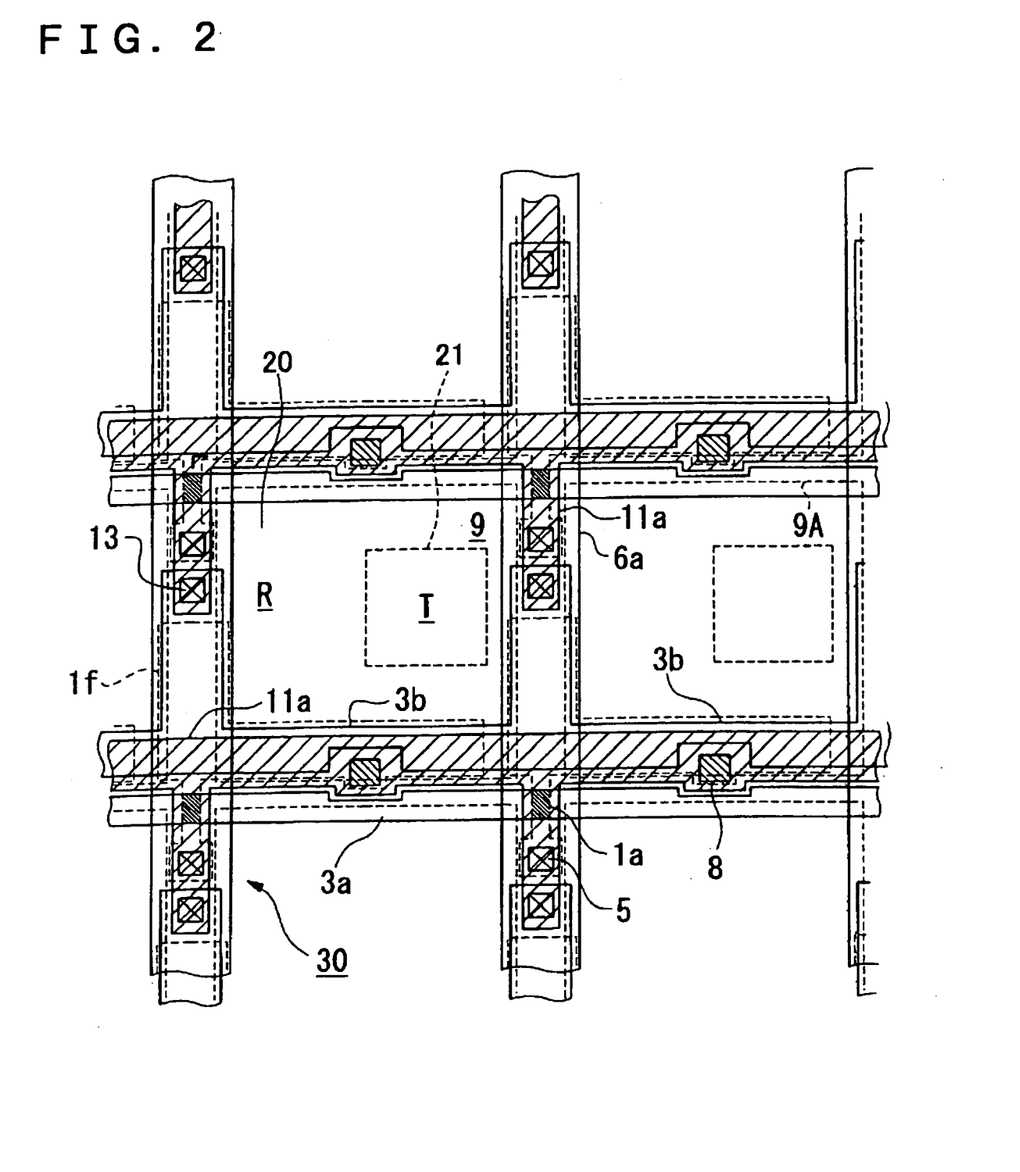
FIG. 2 is a plan view showing a dot structure of the liquid crystal display device.
Figure 3A:
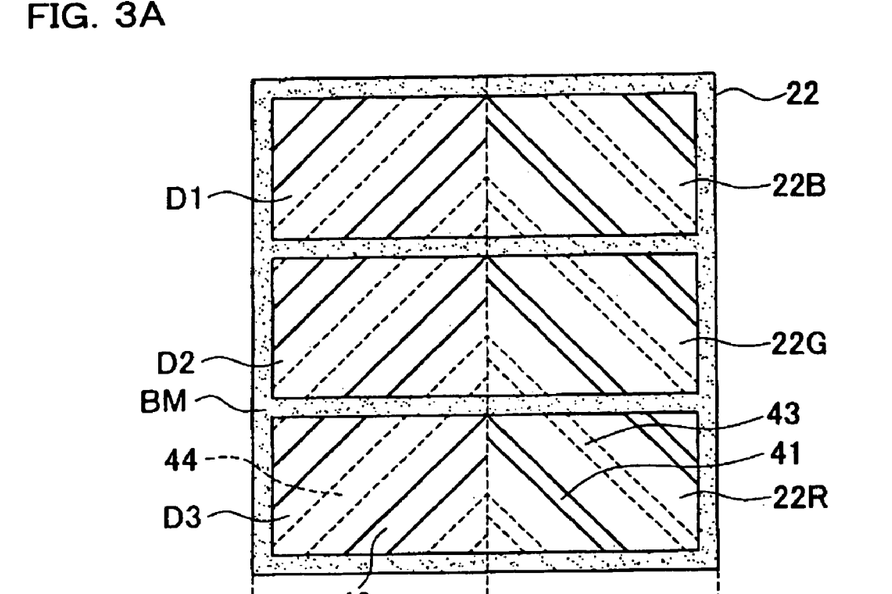
Figure 3B:
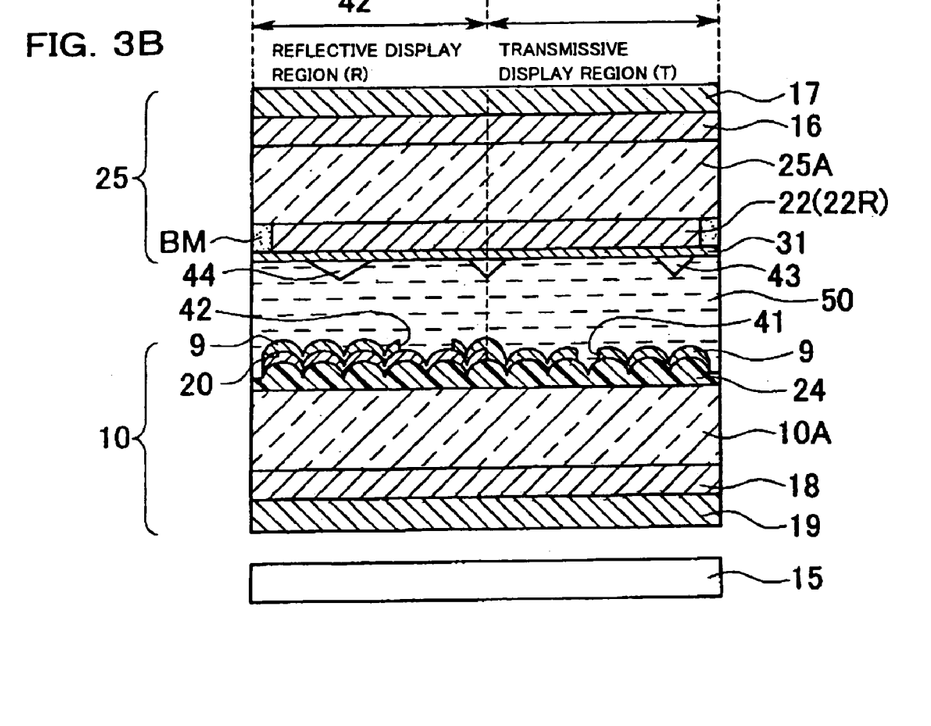

FIG. 1 is an equivalent circuit schematic of a plurality of dots arranged in a matrix constituting image display regions of the liquid crystal display device according to the present exemplary embodiment. FIG. 2 is a plan view showing the structure of adjacent plurality of dots in a TFT array substrate. FIGS. 3(A) and 3(B) are a plan view and a sectional view, respectively, of the structure of the liquid crystal device. In order to allow each layer and member to have a recognizable level of size in the figures, individual layers and members in the following figures have different reduction scales.

In the liquid crystal display device of the present exemplary embodiment with reference to FIG. 1, a plurality of dots arranged in a matrix and constituting image display regions each have a pixel electrode 9 and a TFT 30 serving as a switching element to control the pixel electrode 9. A data line 6a is electrically connected to a source of the TFT 30. To the data line 6a, image signals are supplied. The image signals S1, S2, . . . , Sn to be written in the data line 6a are supplied line-sequentially in this order to each line or supplied to each group of adjacent plurality of data lines 6a. A scanning line 3a is electrically connected to the gate of the TFT 30 to thereby apply pulsewise scanning signals G1, G2, . . . , Gm to the plurality of scanning line 3a in this order line-sequentially in predetermined timing. The pixel electrode 9a is electrically connected to the drain of the TFT 30. By switching "ON" the TFT 30 as a switching element for a predetermined time period, the image signals S1, S2, . . . , and Sn supplied from the data lines 6a are written in predetermined timing.

The image signals S1, S2, . . . , and Sn at a predetermined level written via the pixel electrode 9a on a liquid crystal are held for a predetermined time between the pixel electrode 9a and a counter electrode mentioned later. The liquid crystal changes the alignment and order of its molecular association depending on the level of the applied voltage to modulate light to thereby produce a gradational display. To avoid leakage of the held image signals, a storage capacitance 70 is added in parallel with a liquid crystal capacitance formed between the pixel electrode 9a and the common electrode. The reference numeral 3b represents a capacitive line.

The planar structure of the TFT array substrate constituting the liquid crystal device of the present exemplary embodiment will be illustrated with reference to FIG. 2.

With reference to FIG. 2, the TFT array substrate has a plurality of rectangular pixel electrodes 9 (their outlines are shown by dotted lines 9A) arranged in a matrix and has data lines 6a, scanning lines 3a and capacitive lines 3b arranged along the vertical and horizontal boundaries of the pixel electrodes 9a, respectively. In the present exemplary embodiment, a region corresponding to each pixel electrode 9 and the a region where the data lines 6a, scanning lines 3a, capacitive lines 3b or the like are arranged so as to surround each pixel electrode 9 constitutes one dot region. Each of the dot regions arranged in a matrix can produce a display.

The data lines 6a are electrically connected via a contact holes 5 to source regions, mentioned later, of a semiconductor layer 1a made of, for example, a polysilicon film and constituting the TFT 30. The pixel electrodes 9 are electrically connected via contact holes 8 to drain regions, mentioned later, of the semiconductor layer 1a. The scanning lines 3a are arranged so as to face channel regions (the regions hatched with lines slanted to upper left in the figure) of the semiconductor layer 1a and serve as gate electrodes in portions facing the channel regions.

The capacitive lines 3b have main line sections (namely, first regions arranged along the scanning lines 3a at a top view) extending substantially linearly along the scanning lines 3a and protrusion sections (namely, second regions extending along the data lines 6a at a top view) protruding toward the previous-stage sides (upper direction in the figure) along the data lines 6a from portions where the capacitive lines 3b intersect the data lines 6a.

A plurality of first light shield films 11a are arranged in regions hatched with lines slanted to upper right in FIG. 2.

More specifically, the first light shield films 11a are arranged in such positions as to cover the TFTs 30 including the channel area of the semiconductor layer 1a, when viewed from the TFT array substrate side, and include main line sections extending linearly along the scanning lines 3a and facing the main line sections of the capacitive lines 3b, and protrusion sections protruding from a portion intersecting the data lines 6a toward the adjacent post stage (downward in the figure) along the data lines 6a. The end of the downward protrusion section in each stage (pixel row) of the first light shield films 11a overlaps the end of the upward protrusion of the post-stage capacitive line 3b under the data line 6a. The overlapped portions each include a contact hole 13 that electrically connects between the first light shield film 11a and the capacitive line 3b to each other. In other words, in this exemplary embodiment, the first light shield films 11a are electrically connected to the previous-stage or post-stage capacitive line 3b through the contact holes 13.

With reference to FIG. 2, each one dot region has a reflective film 20 in its center, a region including the reflective film 20 serving as a reflective display region R and the region including no reflective film 20, i.e., a region in the opening 21 of the reflective film 20, serving as a transmissive display region T.

With reference to FIGS. 3(A) and 3(B), the structure of the liquid crystal display device according to the present exemplary embodiment will be illustrated. FIG. 3(A) is a schematic plan view showing a planar structure of a color filter layer in the liquid crystal display device of the present embodiment, and FIG. 3(B) is a schematic sectional view of a portion corresponding to a red pigment layer in the plan view of FIG. 3(A).

The liquid crystal display device of the present exemplary embodiment has dot regions including the pixel electrodes 9 in regions surrounded by, for example, the data lines 6a, the scanning lines 3a, and the capacitive lines 3b as shown in FIG. 2. One dot region (any one of D1, D2, and D3) has a pigment layer of one of three primary colors corresponding to, and the three dot regions D1, D2, and D3 constitute a pixel including pigment layers 22B (blue), 22G (green), and 22R (red).

With reference to FIG. 3(B), the liquid crystal display device of the present exemplary embodiment including a liquid crystal layer 50 held between a TFT array substrate 10 and a counter substrate 25 arranged so as to face the TFT array substrate 10. The liquid crystal layer 50 is made of a liquid crystal material being initially vertically aligned, i.e., having negative dielectric anisotropy. The TFT array substrate 10 partially has a reflective film 20 on the surface of a substrate main body 10A made of a translucent material, such as quartz and glass via an insulating film 24. The reflective film 20 is made of a high-reflective metallic film, such as aluminum and silver. As described above, the region including the reflective film 20 serves as the reflective display region R and the region including no reflective film 20, i.e., the inside of the opening (transmissive region) 21 of the reflective film 20, serves as the transmissive display region T. The liquid crystal display device of the present exemplary embodiment is a vertically aligned liquid crystal display device having a vertically aligned liquid crystal layer and is a transreflective liquid crystal display device that can produce reflective display and transmissive display. The insulating layer 24 has protrusions and depressions in its surface, and the reflective film 20 has protrusions and depressions in its surface corresponding to the above protrusions and depressions. The reflected light is scattered by the protrusions and depressions to reduce or prevent external glare, and the device can obtain displays with wide viewing angles. The transmissive display regions may not necessarily be an opening formed in the reflective film 20 and can be, for example, designed to be a region having optically transmitting device such that the thickness of the reflective film 20 is partially reduced.

The surface of the insulating film 24 including the surface of the reflective film 20 has a pixel electrode 9 made of a transparent conductive film of, for example, indium tin oxide (hereinafter briefly referred to as ITO), and an alignment film (not shown) made of, for example, a polyimide. In the present exemplary embodiment, the reflective film 20 and the pixel electrode 9 are independently formed and laminated. However, it is also acceptable that a reflective film made of a metal film is used as a pixel electrode in the reflective display region R.

The counter substrate 25 has a color filter 22 (the red pigment layer 22R in FIG. 3(B)) on a substrate main body 25A (on a side of the substrate main body 25A facing the liquid crystal layer) made of an optically transparent material, such as glass or quartz. The pigment layer 22R is surrounded by a black matrix BM on its periphery, and the black matrix BM constitutes boundaries of the individual dot regions D1, D2, and D3. In addition, a common electrode 31 made of a transparent conductive film of, for example, ITO and an alignment film (not shown) made of, for example, polyimide are arranged on a side of the color filter layer 22 facing the liquid crystal layer.

The both alignment films of the TFT array substrate 10 and the counter substrate 25 have been treated to be vertically aligned. The TFT array substrate 10 has a retardation plate 18 and a polarizing plate 19 on its outer surface, and the counter substrate 25 has a retardation plate 16 and a polarizing plate 17 on its outer surface so as to enable circular polarizing light to enter the inside of the substrates. The polarizing plate 17 (19) and the retardation plate 16 (18) can have a configuration of a circularly polarizing plate as a combination of a polarizing plate and a quarter-wave retardation plate, a wide-band circularly polarizing plate as a combination of a polarizing plate, a half-wave retardation plate and a quarter-wave retardation plate, or a viewing angle compensating plate as a combination of a polarizing plate, a half-wave retardation plate, a quarter-wave retardation plate and a negative C-plate (a retardation plate having an optical axis in a thickness direction). A backlight 15 serving as an optical source for transmissive display is arranged outside the polarizing plate 19 of the TFT array substrate 10.

The liquid crystal display device of the present exemplary embodiment has slit openings 41 and 42, or protrusions 43 and 44 in each of the transmissive display regions T and the reflective display regions R in at least one of the pair of the substrate to control the alignment of the liquid crystal layer 50. The slit openings 41 and 42 are opened in a part of the electrodes, and the protrusions 43 and 44 are made of a dielectric and arranged on the electrodes. More specifically, the pixel electrodes 9 each have the slit opening 41 in the transmissive display region T and the slit opening 42 in the reflective display region R. The common electrode 31 has the protrusion 43 in the transmissive display region T and the protrusion 44 in the reflective display region R.

The openings 41 and 42 and/or the protrusions 43 and 44 arranged on surfaces sandwiching the liquid crystal layer 50 control the tilt direction of liquid crystal molecules, which have been initially vertically aligned, depending on change in electric field. More specifically, by arranging the openings 41 and 42 in an electrode (in this case, the pixel electrode 9), a direction of electric field between the electrodes tilts from the vertical direction with respect to the substrates, and the tilt direction of the liquid crystal molecules is oriented along the tilt of electric field. On the other hand, by arranging the protrusions 43 and 44 on an electrode (in this case, the common electrode 31), the liquid crystal molecules are vertically aligned with respect to inclined surface of the protrusions, and the tilt direction of the liquid crystal molecules is thereby oriented. The protrusions 43 and 44 herein have, for example, predetermined inclined surface and have a protruded shape extending in a longitudinal direction. The configuration of the protrusions is not specifically limited thereto, as long as they have planes to control the tilt direction of the liquid crystal molecules.

Thus, the alignment of liquid crystal molecules, especially the tilt direction of liquid crystal molecules which have been initially vertically aligned can be controlled both in the transmissive display regions T and in the reflective display regions R. The resulting device can have very wide viewing angle characteristic. More specifically, a contrast of 1:10 or more in a 120° cone in reflective display and a contrast of 1:10 or more in a 160° cone in transmissive display can be obtained.

The liquid crystal display device of the present exemplary embodiment has substantially equal cell gaps in the transmissive display regions T and in the reflective display regions R. More specifically, the cell gap in the transmissive display regions T is larger than that in the reflective display regions R by the thickness of the reflective film 20. Referring to the openings 41 and 42 of the pixel electrode 9, the opening 42 arranged in the reflective display region R has an opening width (opening area) larger than that of the opening 41 arranged in the transmissive display region T, as shown in the plan view of FIG. 3(a). Referring to the resinous protrusions 43 and 44 arranged in the common electrode 31, the protrusion 44 arranged in the reflective display region R has a width larger than that of the protrusion 43 arranged in the transmissive display region T, as shown in the plan view of FIG. 3(A).

Specifically, the opening 42 has an opening width of about 8 μm and the protrusion 44 has a width of about 12 μm in the reflective display region R. In contrast, the opening 41 has an opening width of about 5 μm and the protrusion 43 has a width of about 6 μm in the transmissive display region T. The area occupied by these openings and protrusions in each region, i.e., the occupying area in the substrate plane is about 35% in the reflective display region R and about 19% in the transmissive display region T.

In regions having the openings 41 and 42 and/or the protrusions 43 and 44, a voltage is less applied to the liquid crystal layer 50, and the liquid crystal molecules do not tilt depending on change in voltage, unless a high voltage is applied. In the present exemplary embodiment, the occupying area of the openings and protrusions in the reflective display region R is set larger than that in the transmissive display region T, a relatively high voltage is necessary to move the liquid crystal molecules in the reflective display region R.

As was described relating to the related art technologies, a transreflective liquid crystal display device has a such reflectance-voltage characteristic that a reflectance excessively sharply drops with an increasing voltage in reflective display unless it has a multi-gap structure (refer to FIG. 12(A)). However, a transreflective liquid crystal display device as in the present exemplary embodiment can have reflectance-voltage characteristics in reflective display matching with transmittance-voltage characteristics in transmissive display as shown in FIG. 4, even if has no multi-gap structure. Namely, by setting the occupying area of openings and/or protrusions to control the alignment of liquid crystal molecules relatively larger in the reflective display region R, a voltage required to move the liquid crystal molecules in the reflective display region R can be set relatively larger.

Accordingly, the liquid crystal display device of the present exemplary embodiment can control the alignment of liquid crystal molecules, especially the tilt direction of liquid crystal molecules which have been initially vertically aligned both in the transmissive display regions T and in the reflective display regions R. The liquid crystal display device can have very wide viewing angle characteristics in the individual regions. By setting the in-plane occupying areas by the devices (openings and/or protrusions) to control the alignment of the liquid crystal molecules different between the individual regions, the individual regions can have substantially equal electro-optical characteristics. Thus, the device can be driven at the same voltage both in reflective display and in transmissive display.

The protrusions 43 and 44 can have further larger widths (in-plane occupying areas) without problems. However, the openings 41 and 42 having excessively large widths (opening areas) may induce problems such that liquid crystal molecules in a center part of the openings do not move or operate even when the voltage is increased as high as possible, thus inviting dark display.

Second Exemplary Embodiment

The second exemplary embodiment of the present invention will be illustrated below, with reference to the figures.

Figure 5A:
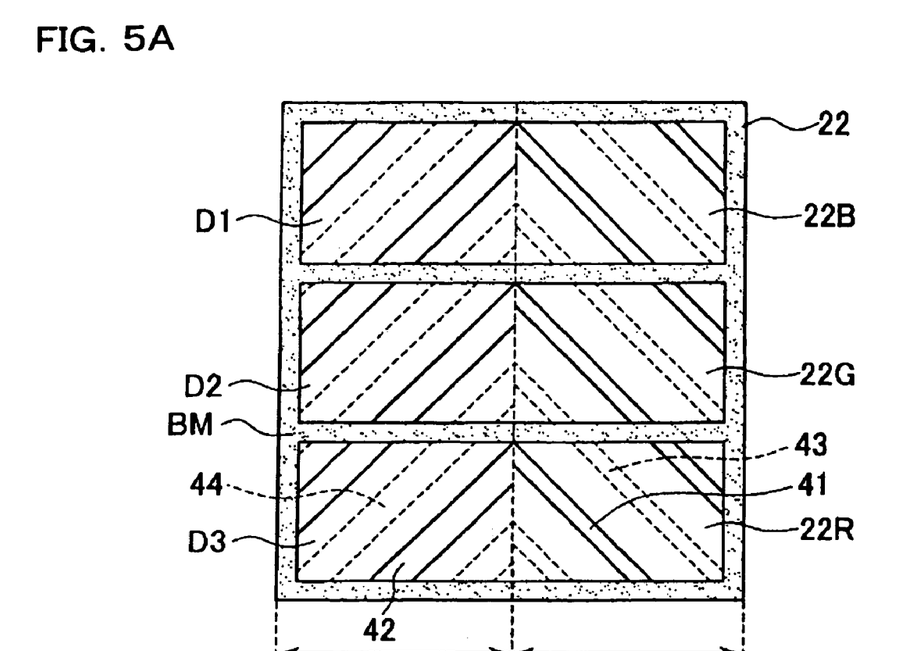
FIGS. 5(A) and 5(B) are a schematic plan view and a schematic sectional view showing the principal parts of a liquid crystal display device according to the second exemplary embodiment.
Figure 5B:
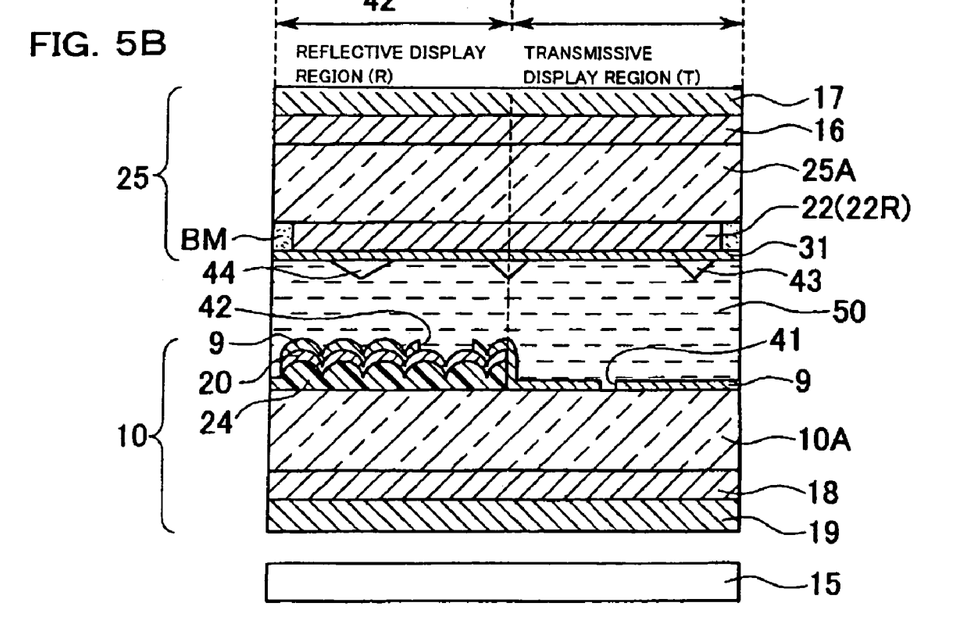

FIGS. 5(A) and 5(B) are a schematic plan view and a schematic sectional view, respectively, of a liquid crystal display device according to the second exemplary embodiment, corresponding to FIGS. 3(A) and 3(B) of the first exemplary embodiment. The liquid crystal display device of the present exemplary embodiment has a similar basic configuration to that in the first exemplary embodiment and has openings 41 and 42 arranged in reflective display regions R and transmissive display regions T of a pixel electrode 9, and protrusions 43 and 44 in reflective display regions R and transmissive display regions T of a common electrode 31. However, the second exemplary embodiment differs from the first exemplary embodiment in that a resinous insulating film 24 is not arranged in the transmissive display regions T, namely, an insulating film 24 having an uneven surface to scatter is selectively arranged in the reflective display regions R alone.

According to this configuration, the transmissive display region has a cell gap larger than that of the reflective display region by 0.7 μm, i.e., a total of the thickness (0.2 μm) of the reflective film 20 and the average thickness (0.5 μm) of the insulating layer 24. To match the reflectance-voltage characteristics in reflective display with the transmittance-voltage characteristics in transmissive display, the difference between cell gaps must be about 2 μm, and a difference of about 0.7 μm is insufficient. The insufficiency can be compensated by setting the areal ratio of the opening and/or the protrusions larger in the reflective display regions as in the first exemplary embodiment.

In the second exemplary embodiment, the opening 42 has an opening width of about 6 μm and the protrusion 44 has a width of about 10 μm in the reflective display region R. In contrast, the opening 41 has an opening width of about 5 μm and the protrusion 43 has a width of about 6 μm in the transmissive display region T. In this case, the in-plane occupying areal ratio of the openings and protrusions in the reflective display region R is about 28%, and the in-plane occupying areal ratio of the openings and protrusions in the transmissive display region T is about 19%.

The device of the second exemplary embodiment can have matched electro-optical characteristics in the reflective display region R and the transmissive display region T even if the difference of the areal ratios between the regions is set smaller than in the first exemplary embodiment, since the difference of cell gaps between the reflective display region R and the transmissive display region T is 0.7 μm in the second exemplary embodiment. In addition, the device can produce brighter transmissive displays since the transmissive display region T has no insulating layer 24.

Third Exemplary Embodiment

The third exemplary embodiment of the present invention will be illustrated below, with reference to FIGS. 6A) and 6(B).

Figure 6A:
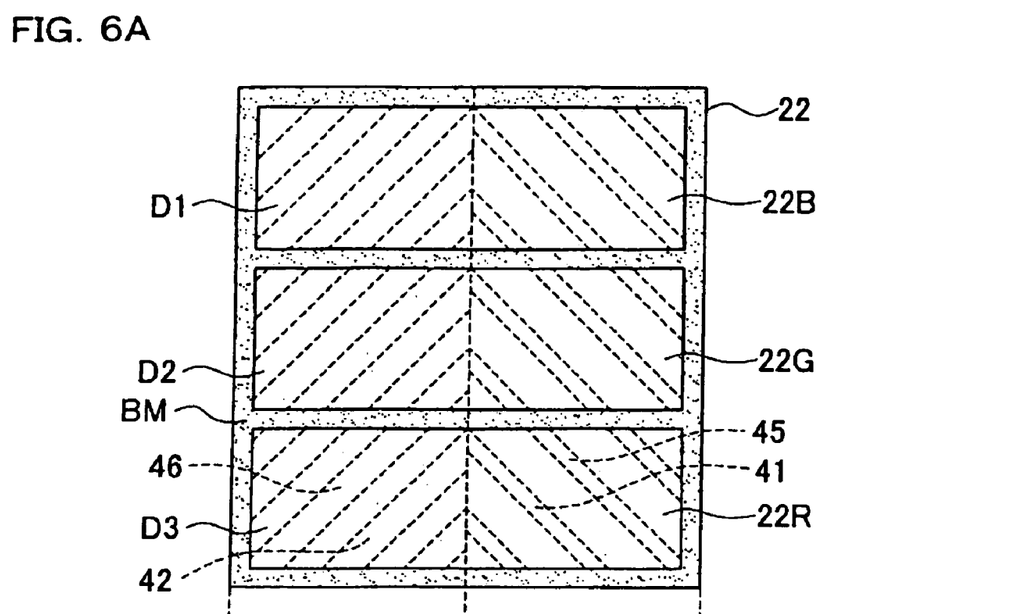
FIGS. 6A and 6(B) are a schematic plan view and a schematic sectional view showing the principal parts of a liquid crystal display device according to the third exemplary embodiment.
Figure 6B:
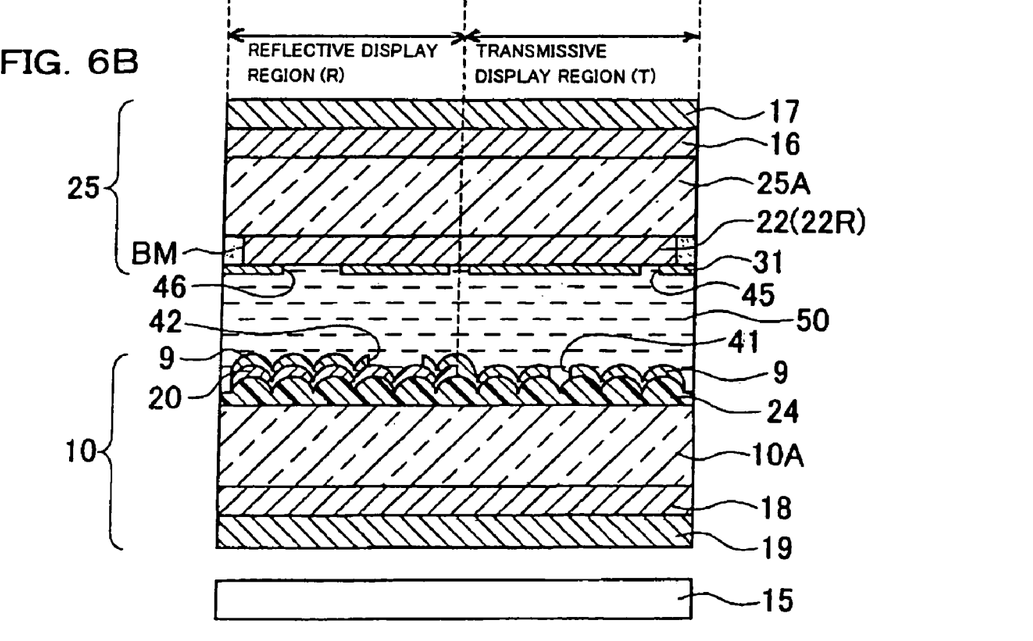

FIGS. 6(A) and 6B) are a schematic plan view and a schematic sectional view, respectively, of a liquid crystal display device according to the third exemplary embodiment, corresponding to FIGS. 3(A) and 3(B) of the first exemplary embodiment. The liquid crystal display device of the present exemplary embodiment differs from the first exemplary embodiment in that a common electrode (counter electrode) 31 on a counter substrate 25 has no protrusions, and that a reflective display region R and a transmissive display region T both have openings 45 and 46. The other configuration is substantially equal to the first exemplary embodiment. Accordingly, the same components in FIGS. 6(A) and 6(B) as in FIGS. 3(A) and 3(B) have the same reference numerals and detailed description thereof is omitted.

In the present exemplary embodiment, the openings arranged in a pixel electrode 9 have an opening width of about 7 μm in the reflective display regions R and about 5 μm in the transmissive display regions T. The openings arranged in the common electrode (counter electrode) 31 have an opening width of about 7 μm in reflective display regions R and about 5 μm in transmissive display regions T. The opening areal ratio of the openings in the reflective display regions R is about 25% and the opening areal ratio of the openings in the transmissive display regions T is about 18%.

The liquid crystal display device having the above configuration can have matched electro-optical characteristics in the reflective display regions R and the transmissive display regions T. When the configuration of the third exemplary embodiment is applied to a liquid crystal display device of a simple matrix system in which both the pixel electrodes 9 and the common electrode (counter electrode) 31 require patterning of electrodes or of active matrix system in which a thin film diode (TFD) is used, photoprocesses in its manufacturing process can be reduced by one, and the device can be easily manufactured at lower cost than a liquid crystal display device having the configuration of the first exemplary embodiment.

As the combination of openings and protrusions arranged in electrodes, the device can employ any of a configuration in which the common electrode (upper substrate) has openings and the pixel electrodes (lower substrate) have protrusions, a configuration in which the common electrode (upper substrate) and the pixel electrodes (lower substrate) have protrusions, a configuration in which only one of the common electrode (upper substrate) and the pixel electrodes (lower substrate) has openings, and a configuration in which only one of the common electrode (upper substrate) and the pixel electrodes (lower substrate) has protrusions.

Fourth Exemplary Embodiment

The fourth exemplary embodiment of the present invention will be illustrated below, with reference to FIGS. 7(A) and 7(B).

Figure 7A:
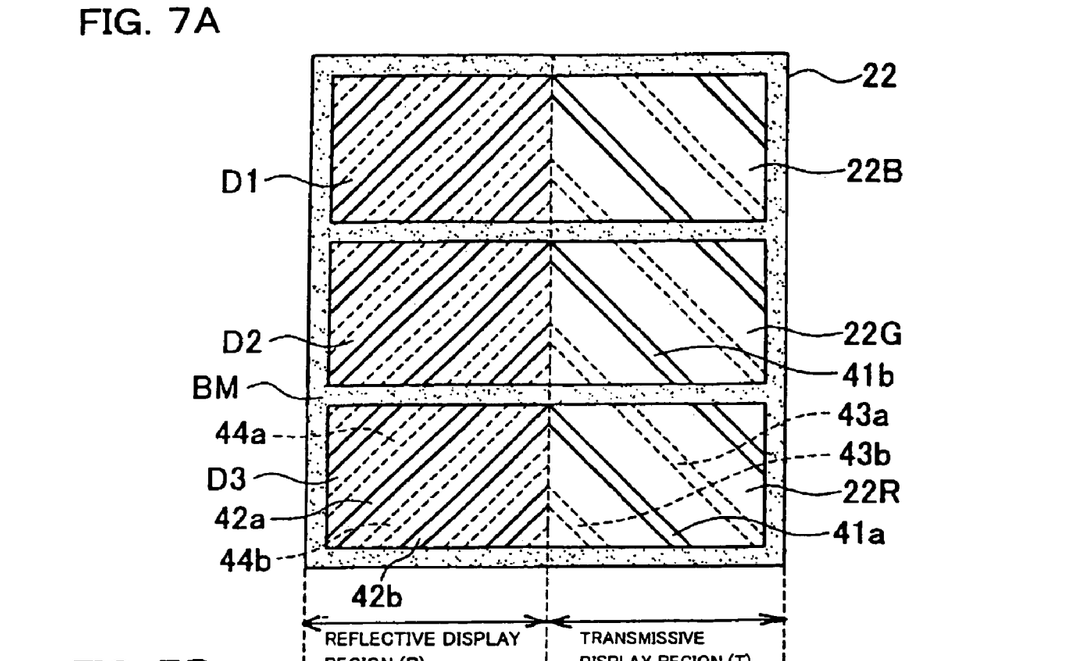
FIGS. 7(A) and 7(B) are a schematic plan view and a schematic sectional view showing the principal parts of a liquid crystal display device according to the fourth exemplary embodiment.
Figure 7B:
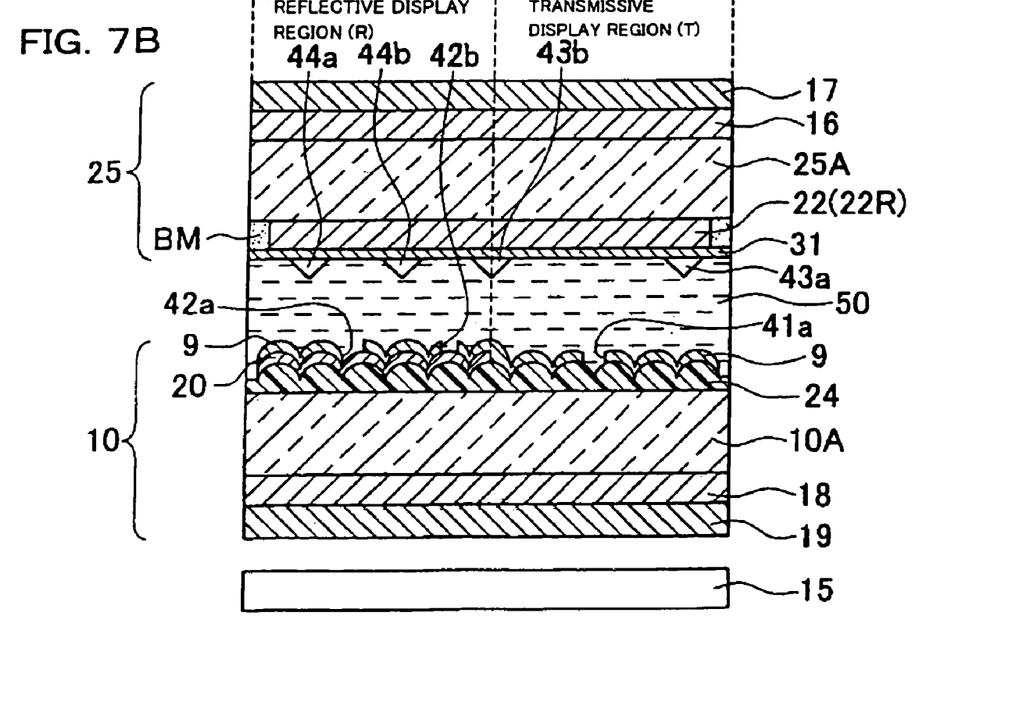

FIGS. 7(A) and 7(B) is a schematic plan view and a schematic sectional view, respectively, of a liquid crystal display device according to the fourth exemplary embodiment, corresponding to FIGS. 3(A) and 3(B) of the first exemplary embodiment. The liquid crystal display device of the present exemplary embodiment has a configuration such that the distance between adjacent two of openings and/or protrusions arranged in reflective display regions R is smaller than the distance between adjacent two of openings and/or protrusions arranged in transmissive display regions T.

Specifically, in this configuration, the pitch between the openings and/or the pitch between the protrusions differs between the reflective display regions R and the transmissive display regions T, and the width of the openings and the width of the protrusions are equal between these regions. The other configuration is substantially the same as the first exemplary embodiment, and common components in FIGS. 7(A) and 7(B) as in FIGS. 3(A) and 3(B) have the same reference numerals and detailed description thereof is omitted.

In the present exemplary embodiment, the openings arranged in the pixel electrodes 9 have an opening width of about 5 μm both in the reflective display regions R and the transmissive display regions T. The protrusions arranged on the common electrode (counter electrode) 31 have a width of about 6 μm both in the reflective display regions R and the transmissive display regions T. The distance (pitch) between a protrusion 44*a* and an adjacent protrusion 44*b* arranged in the reflective display regions R is about 17 μm, and the distance (pitch) between a protrusion 43*a* and an adjacent protrusion 43*b* arranged in the transmissive display regions T is about 34 μm. The areal ratio of the openings and the protrusions in the reflective display regions R is about 38%, and the areal ratio of the openings and protrusions in the transmissive display regions T is about 19%.

The liquid crystal display device having the above configuration can also have matched electro-optical characteristics in the reflective display regions R and the transmissive display regions T. The openings and protrusions having a constant width as in the present exemplary embodiment can simplify photoprocesses in its manufacturing process.

Fifth Exemplary Embodiment

The fifth exemplary embodiment of the present invention will be illustrated below, with reference to FIG. 8.

Figure 8:
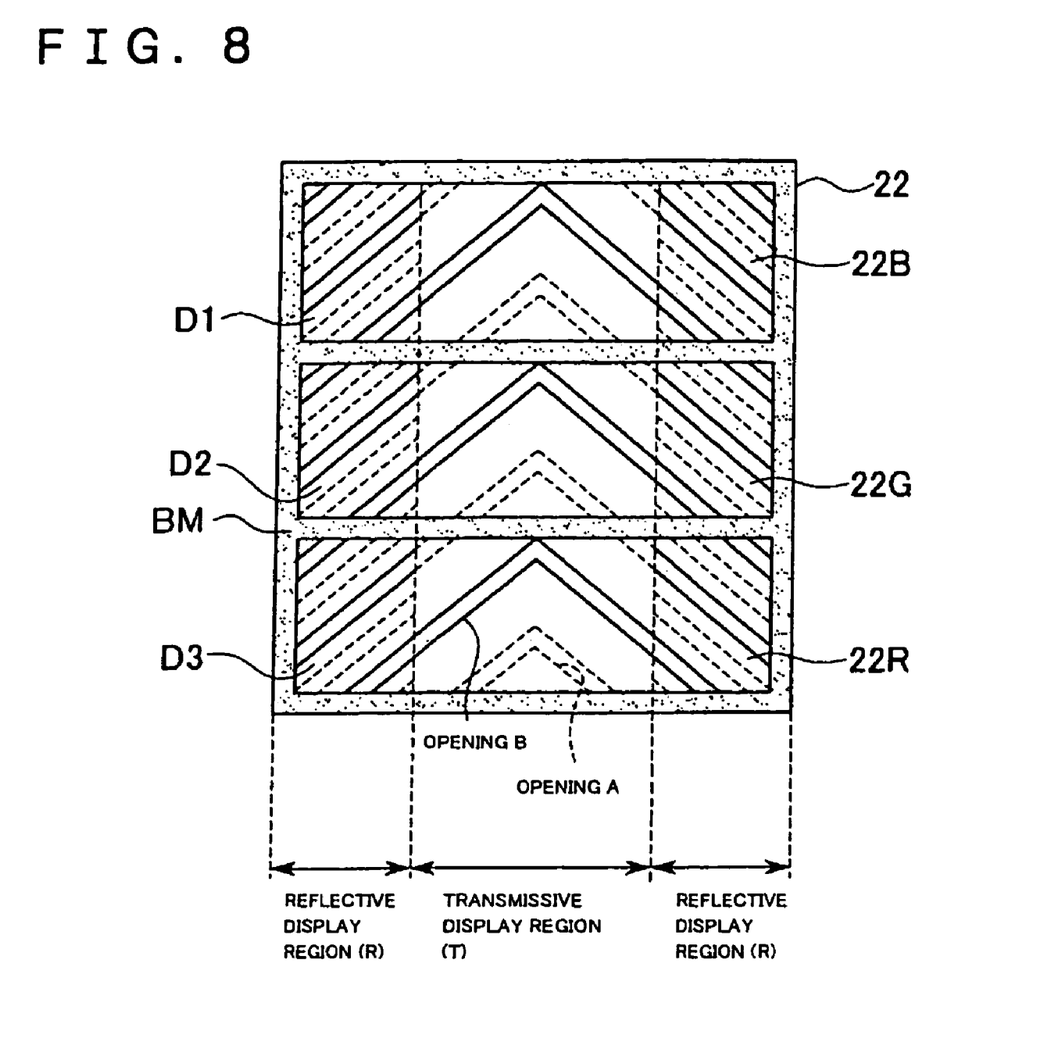
FIG. 8 is a schematic plan view showing the principal parts of a liquid crystal display device according to the fifth exemplary embodiment.

FIG. 8 is a schematic plan view of a liquid crystal display device according to the fifth exemplary embodiment, corresponding to FIG. 7(A) of the fourth exemplary embodiment. In the fifth embodiment, the liquid crystal molecules tilt in different directions between the reflective display regions R and the transmissive display regions T. This may cause asymmetric viewing angle characteristics. In the liquid crystal display device of the present exemplary embodiment, the liquid crystal molecules tilt in substantially same directions in the display regions R and T by allowing the openings and/or protrusions in the individual display regions R and T to be symmetric within a pixel, as shown in FIG. 8. More specifically, a reflective display region R and a transmissive display region T in one pixel are divided in a direction in which the openings and/or protrusions extend, and at least the reflective display region R and the transmissive display region T are arranged in the extending direction. This configuration enables the liquid crystal molecules to tilt in laterally symmetric directions.

In the present exemplary embodiment, each of the pixel electrodes and the common electrode has openings alone. With reference to FIG. 8, an opening A is an opening arranged in the common electrode, and an opening B is an opening arranged in the pixel electrode. The pitch of openings differs between the transmissive display regions T and the reflective display regions R as in the fourth exemplary embodiment. As is described above, openings having a larger width may frequently induce problems. Thus, when openings are formed, their areal ratio is preferably controlled by controlling the pitch thereof. The other configuration is substantially the same as the fourth exemplary embodiment, and common components in FIG. 8 as in FIGS. 7(A) and 7(B) have the same reference numerals and detailed description thereof is omitted.

In the present exemplary embodiment, the openings arranged in a pixel electrode 9 have an opening width of about 5 µm both in the reflective display regions R and the transmissive display regions T. The openings arranged in the common electrode (counter electrode) 31 have an opening width of about 5 µm both in the reflective display regions R and the transmissive display regions T. The pitch between an opening and an adjacent opening arranged in the reflective display regions R is about 17 µm, and the pitch between an opening and an adjacent opening arranged in the transmissive display regions T is about 34 µm. The opening areal ratio of the openings in the reflective display regions R is about 36% and the opening areal ratio of the openings in the transmissive display regions T is about 18%.

The liquid crystal display device having the above configuration can also have matched electro-optical characteristics in the reflective display regions R and the transmissive display regions T. It can yield vertically and laterally symmetric viewing angle characteristics both in the reflective display regions R and the transmissive display regions T.

Sixth Exemplary Embodiment

The sixth exemplary embodiment of the present invention will be illustrated below, with reference to FIGS. 9(A) and 9(B).

Figure 9A:
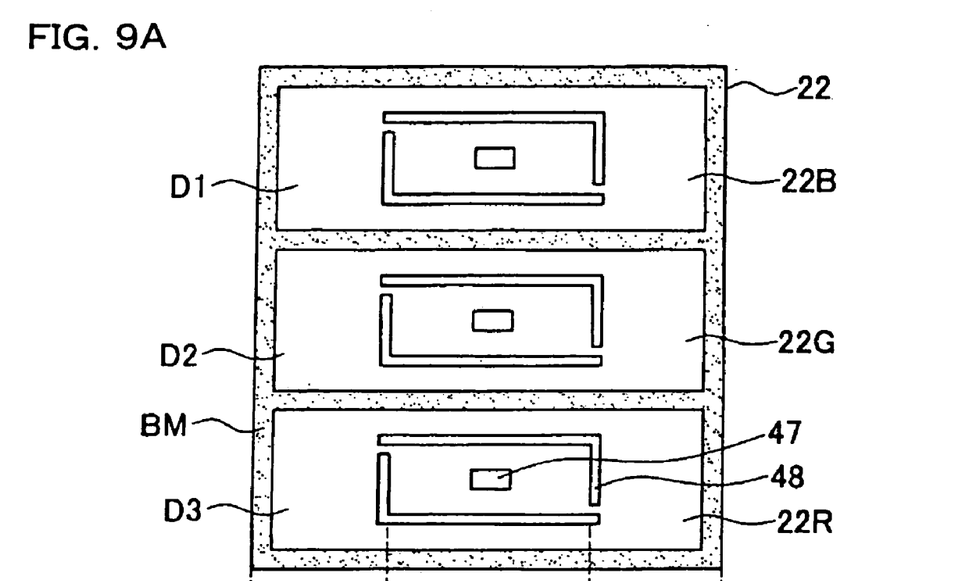
FIGS. 9(A) and 9(B) are a schematic plan view and a schematic sectional view showing the principal parts of a liquid crystal display device according to the sixth exemplary embodiment.
Figure 9B:
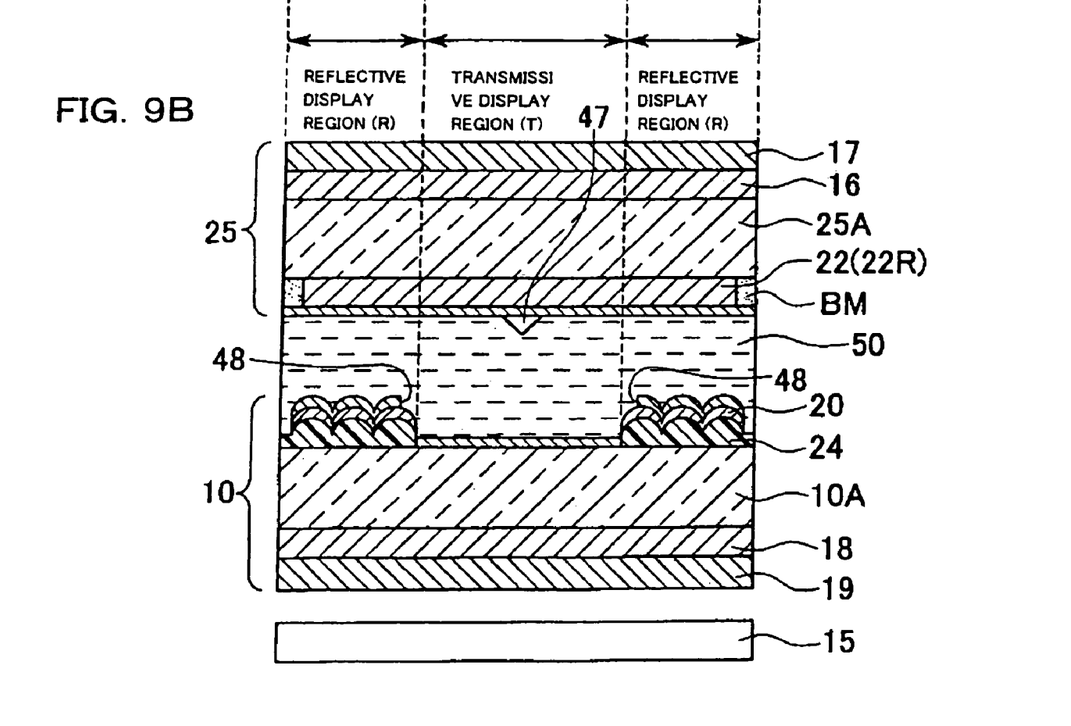

FIGS. 9(A) and 9(B) are a schematic plan view and a schematic sectional view of a liquid crystal display device according to the sixth exemplary embodiment, corresponding to FIGS. 3(A) and 3(B) of the first exemplary embodiment. The liquid crystal display device of the present exemplary embodiment has transmissive display regions T at the center of dots (D1, D2, and D3), resinous protrusions 47 at the center thereof, and slit openings 48 in a reflective display region R around the dots. A pixel electrode arranged in the transmissive display region T and another pixel electrode arranged in the reflective display region R are connected through bridges at two points. The other configuration is substantially the same as the first exemplary embodiment, and common components in FIGS. 9(A) and 9(B), as in FIGS. 3(A) and 3(B), have the same reference numerals and detailed description thereof is omitted.

Figure 10:
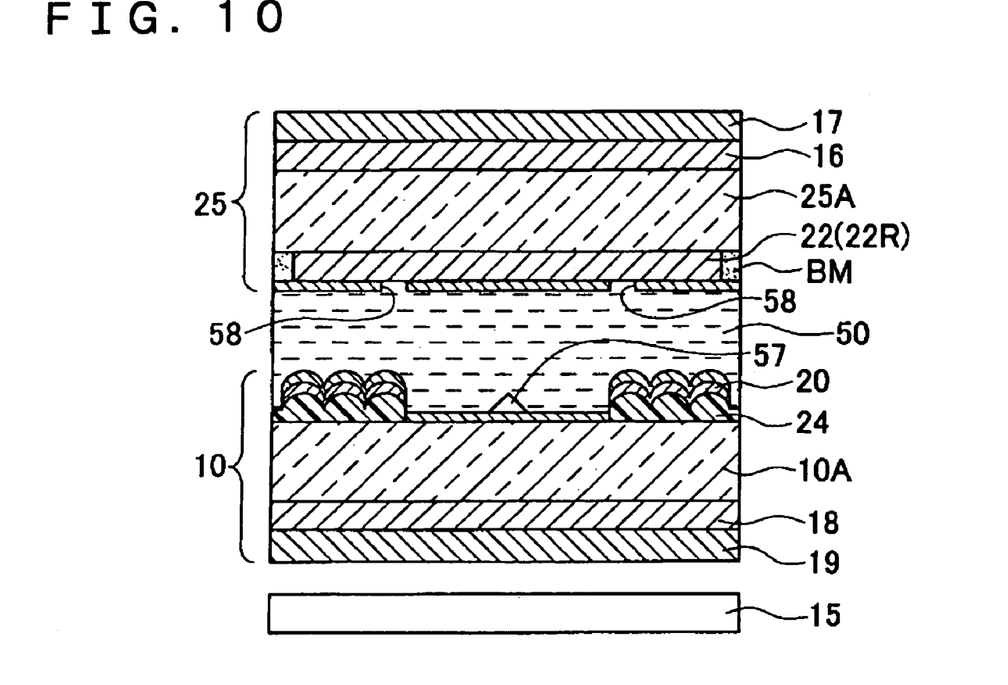
FIG. 10 is a schematic sectional view showing a modified example of the liquid crystal display device of FIG. 9.

In the present exemplary embodiment, the areal ratio of openings 48 in the reflective display region R is about 19%, and the areal ratio of the protrusions 47 in the transmissive display region T is about 6%. The liquid crystal display device having the above configuration can also have matched electro-optical characteristics in the reflective display region R and the transmissive display region T. The present exemplary embodiment can more easily control the tilt direction of liquid crystal molecules, since the openings 48 are arranged at boundaries between the transmissive display region T and the reflective display region R, where the alignment is apt to become disordered due to some steps. Advantages as in the present exemplary embodiment can be obtained when protrusions 57 are arranged on the pixel electrode 9 and openings 58 are arranged in the common electrode 31, as shown in FIG. 10. Quadrangular pyramids are illustrated as the protrusions 47 and 57 in FIGS. 9 and 10, but one having a predetermined inclined surface as in a cone or the like can also be employed.

Electronic Equipment

A specific example of electronic equipment having the liquid crystal display device according to the above exemplary embodiments of the present invention will be illustrated.

Figure 11:
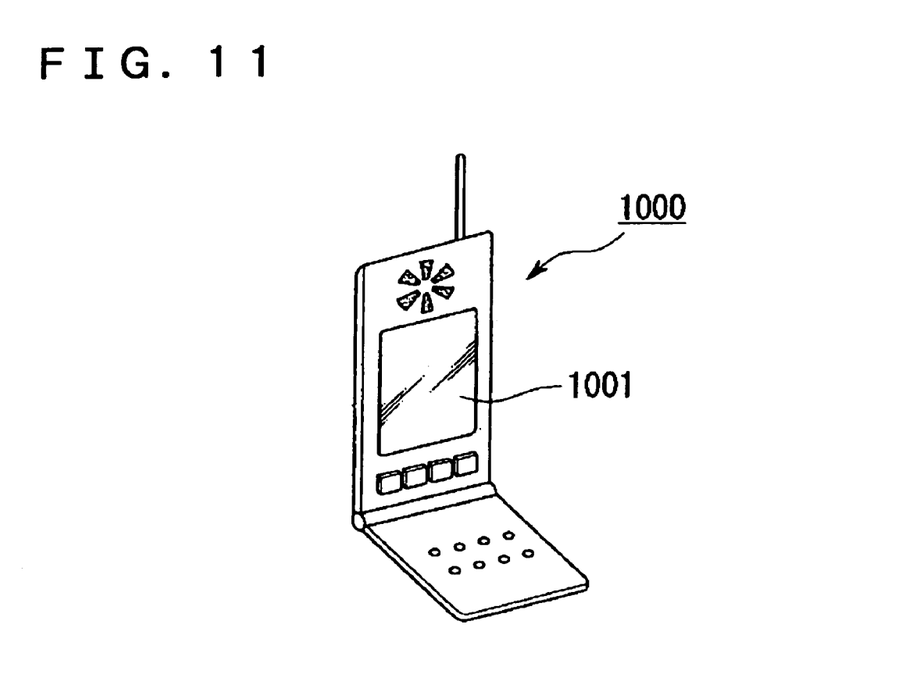
FIG. 11 is a perspective view showing an example of electronic equipment of the present invention.

FIG. 11 is a perspective view showing an example of mobile phones. FIG. 11 illustrates a mobile phone main body 1000 and a display unit 1001 using the liquid crystal display device. By using the liquid crystal display device of the above exemplary embodiments in a display unit of electronic equipment, such as mobile phones, the resulting electronic equipment can yield a bright and high-contrast liquid crystal display portion having a wide viewing angle irrespective of use environment.

The technical scope of the present invention is not limited to the above exemplary embodiments, but various modifications are possible without departing from the scope of the invention. For example, while in the above exemplary embodiments, the present invention is applied to an active-matrix liquid crystal display using a TFT as a switching element, it is also possible to apply the present invention to, for example, an active-matrix liquid crystal display, a passive-matrix liquid crystal display and so on that use a thin-film-diode (TFD) switching element. Specific description about, for example, the materials, sizes, shapes of various components may be changed as appropriate.

What is claimed is:

1. A liquid crystal display device, comprising:
 a pair of substrates having an electrode, each electrode being arranged on a side of an opposite surface;
 a liquid crystal layer held between the substrates and having a transmissive display region for transmissive display and a reflective display region for reflective display in each of a plurality of dot regions,
 the liquid crystal layer including a liquid crystal having negative dielectric anisotropy; and
 a plurality of alignment controlling elements controlling the alignment of the liquid crystal in the transmissive display region and the reflective display region, the alignment controlling elements provided on the electrode of at least one of the pair of substrates, the alignment controlling elements including an alignment controlling element having a linear portion that extends across the reflective display region of one dot region and an alignment controlling element having a linear portion that extends across the transmissive display region of the dot region, the linear portion in the reflective display region having a greater cross-sectional area than the linear portion in the transmissive display region.

2. The liquid crystal display device according to claim 1, the distance between the electrodes arranged on the pair of substrates being substantially equal in the transmissive display region and the reflective display region.

3. The liquid crystal display device according to claim 1, the distance between adjacent two of the alignment controlling elements arranged in the reflective display region being smaller than the distance between adjacent two of the alignment controlling elements arranged in the transmissive display region.

4. The liquid crystal display device according to claim 1, further comprising:
 a backlight for transmissive display arranged on an opposite side to the liquid crystal layer with respect to the one substrate of the pair of substrates, and
 a reflective film provided on a side facing the liquid crystal layer on the one substrate, the reflective layer being selectively arranged in one dot region, the region of which the reflective layer arranged correspond to the reflective display region.

5. The liquid crystal display device according to claim 4, further comprising:
 a color filter layer provided on a side facing the liquid crystal layer on the one substrate provided the reflective layer, or on a side facing the liquid crystal layer on the other substrate.

6. Electronic equipment, comprising:
 the liquid crystal display device according to claim 1.

7. The liquid crystal display device according to claim 1, the alignment controlling elements having at least one of a slit opening being removed as part of the electrode and a dielectric protrusion being arranged on the electrode.

8. The liquid crystal display device according to claim 7, the dielectric protrusion being arranged on the electrode and having an inclined surface inclining at a predetermined angle to the electrode surface.

9. The liquid crystal display device according to claim 7, slit openings and/or dielectric protrusions having a configuration to control the tilt direction of the vertically aligned liquid crystal molecules depending on change in electric field.

10. A liquid crystal display device, comprising:
 a pair of substrates having an electrode each arranged on a side of opposite surface;
 a liquid crystal layer held between the substrates and having a transmissive display region for transmissive display and an island-shaped reflective display region for reflective display in each of a plurality of dot regions, the liquid crystal layer including a liquid crystal having negative dielectric anisotropy; and
 a plurality of alignment controlling elements controlling the alignment of the liquid crystal in each of the transmissive display region and the reflective display region, the alignment controlling elements provided on the electrode of at least one of the pair of substrates, the occupying area of the alignment controlling elements in a plane direction of the substrate being set larger in the reflective display region than in the transmissive display region, the distance between adjacent two of the alignment controlling elements arranged in the same island-shaped reflective display region of the dot being smaller than the distance between adjacent two of the alignment controlling elements arranged in the transmissive display region of the dot.

11. The liquid crystal display device according to claim 10, the alignment controlling elements having at least one of a slit opening being removed, a part of the electrode and a dielectric protrusion being arranged on the electrode.

12. The liquid crystal display device according to claim 11, the dielectric protrusion being arranged on the electrode and having an inclined surface inclining at a predetermined angle to the electrode surface.

13. The liquid crystal display device according to claim 11, both openings and dielectric protrusions having a configuration to control the tilt direction of the vertically aligned liquid crystal molecules depending on change in electric field.

14. The liquid crystal display device according to claim 10, the distance between the electrodes arranged on the pair of substrates being substantially equal in the transmissive display region and the reflective display region.

15. The liquid crystal display device according to claim 10, the alignment controlling elements including an alignment controlling element having a linear portion that extends across the reflective display region of one dot region and an alignment controlling element having a linear portion that extends across the transmissive display region of the dot region.

16. The liquid crystal display device according to claim 10, further comprising:
 a backlight for transmissive display arranged on an opposite side to the liquid crystal layer with respect to the one substrate of the pair of substrates, and
 a reflective film provided on a side facing the liquid crystal layer on the one substrate, the reflective layer being selectively arranged in one dot region, the region of which the reflective layer arranged correspond to the reflective display region.

17. The liquid crystal display device according to claim 4, further comprising:
 a color filter layer provided on a side facing the liquid crystal layer on the one substrate provided the reflective layer, or on a side facing the liquid crystal layer on the other substrate.

18. Electronic equipment, comprising: the liquid crystal display device according to claim 10.

* * * * *